United States Patent [19]

Genrich

[11] Patent Number: 4,873,500

[45] Date of Patent: Oct. 10, 1989

[54] PHASE ACCUMULATION CONTINUOUS PHASE MODULATOR

[75] Inventor: Thad J. Genrich, Scottsdale, Ariz.

[73] Assignee: Motorola, Inc., Schaumburg, Ill.

[21] Appl. No.: 188,440

[22] Filed: Apr. 29, 1988

[51] Int. Cl.[4] .............................................. H04L 27/12
[52] U.S. Cl. .................................... 332/104; 332/144; 375/67
[58] Field of Search .................... 332/9 R, 16 R, 23 R; 375/44, 45, 47, 52, 62, 67

[56] References Cited

U.S. PATENT DOCUMENTS

| | | | |
|---|---|---|---|
| 4,603,393 | 7/1986 | Laurent et al. | 329/137 X |
| 4,672,634 | 6/1987 | Chung et al. | 332/16 R X |
| 4,686,688 | 8/1987 | Chung et al. | 375/47 |
| 4,750,192 | 6/1988 | Dzung | 332/18 X |

OTHER PUBLICATIONS

Anderson et al., *Digital Phase Modulation*, Plennum Press, New York, 1986, pp. 211–221.

Sundberg, "Continuous Phase Modulation", IEEE Communications Magazine, Apr. 1986, vol. 24, No. 4, pp. 25–38.

*Primary Examiner*—Siegfried H. Grimm
*Attorney, Agent, or Firm*—Frank J. Bogacz

[57] ABSTRACT

A general purpose continuous phase modulator is shown which greatly reduces the amount of memory and associated hardware complexity traditionally found in continuous phase modulators. The continuous phase modulator includes a phase accumulator which calculates the phase state in an on-line real time fashion. As a result, a continuous phase modulator is provided which is adaptable to any transmitter or transceiver product requiring power and bandwidth efficiency such as those found in satellite communications equipment.

27 Claims, 2 Drawing Sheets

PHASE ACCUMULATION CONTINUOUS PHASE MODULATOR

BACKGROUND OF THE INVENTION

The present invention pertains to a constant amplitude envelope continuous phase modulator and more particularly to a scheme for greatly reducing the amount of memory required for a general purpose continuous phase modulator.

A demodulator arrangement for employing phase modulation is shown in U.S. Pat. No. 4,603,393, issued on July 29, 1986, to P. Laurant.

A continuous phase modulator is shown in publication "Digital Phase Modulation" by J. Anderson, T. Aulin and C. Sundberg, copyright 1986, Plenum Press, ISBN 0-306-42195-X. At pages 214 and 215 of this publication, variations of a modulation scheme are shown. Both variations of this modulation scheme include a phase state read-only-memory (ROM). For rational values of a modulation index h, the modulator produces one of a finite number of phase states during each symbol interval. The total number of phase states S is given by the formula $S = 2*M\exp(L-1)$, (or 2 times M raised to the power of $L-1$) where M is the number of symbols transmitted during a symbol period and L is the number of symbol periods. Such continuous phase modulators as the one shown in this publication encode each of the possible states as a binary value. Every location of the ROM is programmed to output the phase state given the current phase state and output symbol. For the case of a modulation index of $\frac{1}{8}$ ($h=\frac{1}{8}$), 8 symbols per period ($M=8$) and 6 symbol periods ($L=6$), the phase state ROM would have to have 4,194,304 locations of 19 bits each for a total of 79,691,776 bits of total storage.

Large storage requirements prohibit use of such circuitry for satellite communications. In addition, such circuitry requires a great amount of power. Accordingly, it is an object of the present invention to provide a continuous phase modulation arrangement which minimizes the amount of memory required and thereby the amount of power also required.

SUMMARY OF THE INVENTION

In accomplishing the object of the present invention, a novel continuous phase modulation arrangement which minimizes the amount of system memory will be shown.

A phase accumulator continuous phase modulator has a symbol input and a symbol clock input. The phase accumulator continuous phase modulator provides the phase state of the symbol input. The phase state includes quadrature and in-phase signals.

The phase accumulator includes register arrangement which is connected to the symbol input and to the clock input. The register input operates to sequentially store a plurality of bits of each symbol. A clock is connected to the symbol clock input. The clock also has a second input which is equal to the number of samples per symbol. The clock produces first and second clock signals.

The phase accumulator continuous phase modulator also has a phase incrementor which is connected to the register arrangement and to the clock. The phase incrementor operates in response to the first clock signal to produce a plurality of phase increment signals which are functions of the symbol input.

The phase accumulator continuous phase modulator also includes a phase accumulator. The phase accumulator is connected to the phase incrementor and to the clock. The phase accumulator operates in response to the second clock signal to sequentially add each of the plurality of phase increment signals to produce the phase state signal.

DESCRIPTION OF THE PREFERRED EMBODIMENT

Figure 1:
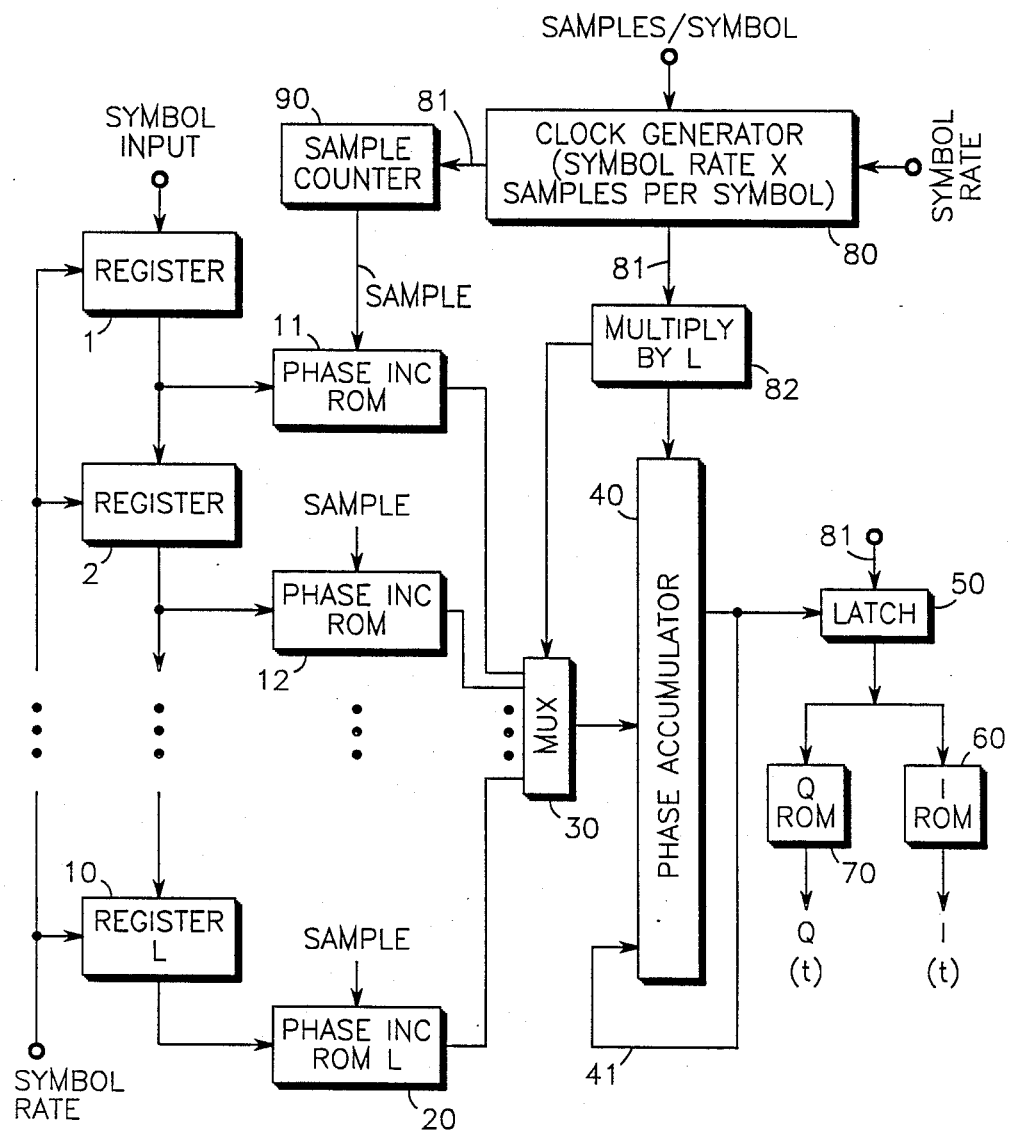
FIG. 1 illustrates one embodiment of the principles of operation of the present invention.

Referring to FIG. 1, a phase accumulator continuous phase modulator is shown. Continuous phase modulation (CPM) refers to digital modulation techniques which emphasize power and bandwidth efficiency with a constant amplitude envelope. Data symbols are represented as phase shifts which can be expressed as the integral of frequency pulses from the modulator. The shape of the frequency pulse determines the CPM modulation type. Some common pulse shapes are rectangular (MSK) and raised cosine These frequency pulses last from one to several (L) symbol periods (T) depending on the desired degree of intersymbol interference or smoothing. In general, one of (M) possible symbols is transmitted per symbol period.

A general purpose CPM modulator must be able to produce a variety of pulse shapes with various pulse durations. As previously mentioned, for rational values of the modulation index (h), the modulator produces one of a finite number of phase states at each symbol interval. For the art previously mentioned, the phase state (ROM) must have the number of locations equal to $2*M\exp(L)$ of which each location must be ceil ($\log 2$ $2*M\exp(L-1)/h$) bits wide. (The ceil operator returns the next larger integer, if the fractional portion of the operand is non-zero.) As was previously mentioned, these phase state ROMs are quite large and require considerable amounts of power.

The present invention employs a digital phase accumulator 40 to compute the phase states in an on-line, real time fashion. The digital data to be modulated is input to this system via the SYMBOL INPUT lead or bus (more than one bit per symbol). Symbols are typically 5 bits or less in width. Symbols of greater length may also be used, but would require extensive circuitry for demodulation. The pulse of bits on the SYMBOL INPUT lead or bus in the case of more than one bit per symbol is input to a serial set of L registers (10 registors are shown in this implementation). If four bits per symbol are required, two bus leads will be connected to each register. Each register may be implemented with a D-type flip-flops. Each of the bits comprising a symbol are successively clocked into registers 1 through 10 under control of the symbol rate signal which is applied to each of registers 1 through 10 via the symbol rate lead from a clock, not shown. Each of the registers 1 through 10 stores the bits indicating each symbol from the previously transmitted $L-1$ symbols.

Clock generator 80 has, as an input to it, the SYMBOL RATE signal via the corresponding lead and a signal which indicates the number of SAMPLES PER SYMBOL. From these two signals, clock generator 80 produces a clock signal on lead 81 which is connected to sample counter 90. Sample counter 90 determines the sample being processed and provides this signal as an output on the SAMPLE lead or bus The SAMPLE lead connects sample counter 90 to each of the phase incrementing ROMs L (11 through 20 are shown). In addition, the output of clock generator 80, lead 81, connects clock 80 to latch 50.

Each of the L registers has an input to each of the L phase incrementing ROMs. Register 1 is connected to phase incrementing ROM 11, register 2 is connected to phase incrementing ROM 12, register 10 is connected to phase incrementing ROM 20. This relationship holds true for each of the L registers and L phase incrementing ROMs. Each phase incrementing ROM contains an incremental phase shift due to the contributions of the present symbol at its input.

Each of the outputs of phase incrementing ROMs 11 through 20 is connected to multiplexer 30. Multiplexer 30 is connected to phase accumulator 40. In addition, lead 81 transmits a signal which is the symbol rate times the samples per symbol 81 and this signal is derived by clock generator 80, clock generator 80 is connected to multiply by L circuit 82 via leads 81. Circuit 82 multiplies the signal on lead 81 by L, which is the number of registers The output of circuit 82 is connected to and clocks phase accumulator 40. Phase accumulator 40 computes the phase states by sequentially summing each of the incremental phase shifts retrieved from ROMs 11 through 20. The intermediate sum of each of the phase incrementing ROMs is transmitted from the output of phase accumulator 40 to the input of phase accumulator 40 via lead 41. This provides for adding the output of each phase incrementing ROM in its proper sequence in order to compute the phase state. The output of each phase incrementing ROM is multiplexed through multiplexer 30 to phase accumulator 40 at the appropriate time in order for phase accumulator 40 to provide the proper sum. Latch 50 is connected to the output of phase accumulator 40 via lead 41. In response to the clock signal of lead 81, latch 50 stores the resultant phase state sum of accumulator 40. The output of latch 50 is connected to I ROM 60 and Q ROM. The value transmitted from latch 50 to I ROM 60 causes I ROM 60 to output the in-phase portion of the symbol or the sine of the angle of phase on the I(t) lead. Similarly, the output of latch 50 causes Q ROM 70 to output the quadrature portion of the symbol or the cosine of the angle of phase on the Q(t) lead.

In the present implementation, the phase incrementing ROMs each have M times the number of samples per symbol locations when M is a power of 2. A width of these ROMs of 16 bits provides adequate resolution for most applications. For the above example of $h = \frac{1}{2}$, $M = 8$, $L = 6$ with 8 samples per symbol, 6 phase incrementing ROMs of 64 words each by 16 bits would be required by the present invention. This amounts to a total of 6144 bits of storage as contrasted with over 79 million bits of storage required by previous implementations.

Figure 2:
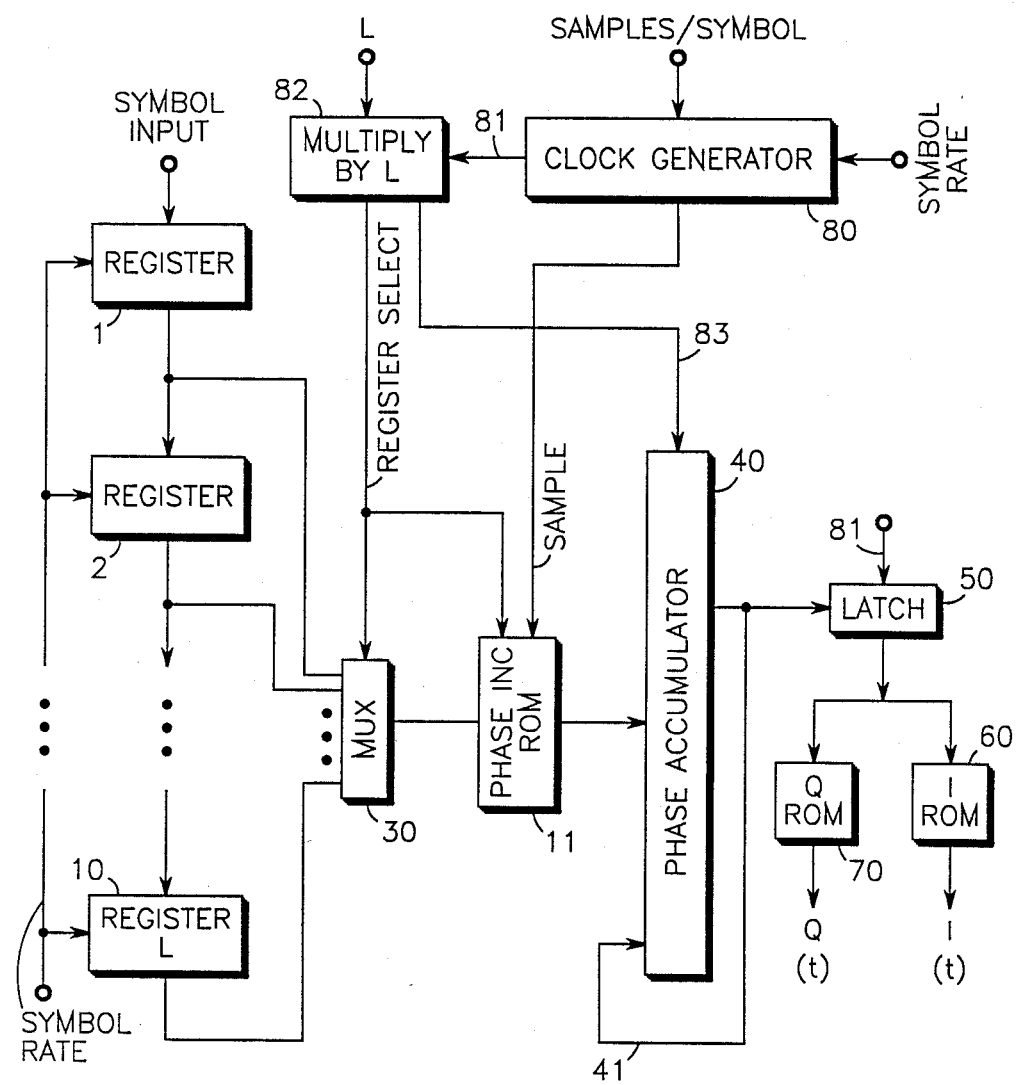
FIG. 2 illustrates another embodiment of the present invention.

Referring to FIG. 2, an alternate embodiment of the present invention is shown. The chief difference between the implementation of FIG. 2 and FIG. 1 is that in FIG. 2, a phase incrementing ROM 11 is implemented on one physical ROM chip. Again, as in the previous embodiment, the SYMBOL INPUT lead or bus is connected to registers 1 through 10. There may be up to L registers. Each register may be implemented with D-type flip-flops. Each of the bits comprising a symbol are successively clocked into registers 1 through 10 under control of the SYMBOL RATE signal which is applied to each of the registers.

In this implementation, clock generator 80 now includes the functions provided by clock generator 80 and sample counter 90 of FIG. 1. Clock generator 80 has as inputs the number of SAMPLES PER SYMBOL and the SYMBOL RATE. Clock generator 80 multiplies the SYMBOL RATE by the SAMPLES PER SYMBOL and produces this output on lead 81. Lead 81 connects clock generator 80 to multiply by L circuit 82. Multiply by L circuit 82 produces an output on lead 83 which is the SYMBOL RATE times the SAMPLES PER SYMBOL times L. Lead 83 connects multiply by L circuit 82 to a clock input of phase accumulator 40.

Multiply by L circuit 82 also provides an output on the REGISTER SELECT lead which connects multiply by L 82 to multiplexer 30 and to phase increment ROM 11. The REGISTER SELECT signal indicates which register, 1 through 10, is currently outputting to multiplexer 30. Clock generator 80 also produces another output on the SAMPLE lead. The SAMPLE lead connects clock generator 80 to phase increment ROM 11. The SAMPLE lead provides the same function as the SAMPLE lead shown in FIG. 1.

The SYMBOL RATE clocks each of the registers 1 through 10 via the SYMBOL RATE lead. The output of each of the registers 1 through 10 is connected to multiplexer 30. The output of multiplexer 30 is connected as an address to phase increment ROM 11. Phase increment ROM 11 has its output connected to an input of phase accumulator 40. The other input to phase accumulator 40 is via lead 41 which connects the output of phase accumulator 40 to the input of phase accumulator 40.

The output of phase accumulator 40 is also connected to latch 50. Clock generator 80 is connected to latch 50 via lead 81. The output of latch 50 is connected to I ROM 60 and to Q ROM 70. The value transmitted from latch 50 to I ROM 60, causes I ROM 60 to output the in-phase portion of the symbol or the sine of the angle of phase on the I(t) lead. Similarly, the output of latch 50 causes Q ROM 70 to output the quadrature portion of the symbol or the cosine of the angle of phase on the Q(t). The operation of phase accumulator 40, latch 50, I ROM 60 and Q ROM 70 is exactly as described above for FIG. 1. The implementation efficiencies achieved by FIG. 2 over FIG. 1 result from the one physical phase increment ROM 11 shown in FIG. 2.

In FIG. 1, each of the ROMs 11 through 20 is a separate physical ROM and their output must be multiplexed for transmission to phase accumulator 40. In FIG. 2, the outputs of each register are multiplexed and each output is sequentially supplied as an address to one physical phase increment ROM 11. This reduces the overall chip count of the circuitry of the ROMs from L(1 ROM corresponding to each of the L registers) to one physical ROM which has L contiguous segments. This change also necessitates multiplexing the outputs of the registers before input to phase increment ROM 11. Further, it is to be noted that phase ROM 11 must have as an input an indication of the particular register which is transmitting data to phase increment ROM 11. This is achieved via the REGISTER SELECT signal supplied on the corresponding lead.

The contents of phase increment ROM 11 or phase increment ROMs 11 through 20 of FIG. 1 must contain values which are rounded off values in the case of h being equal to a number not evenly divisible. For example, if h is equal to ⅓, the phase increment ROM is required to contain the number 0.3333 etc. to as many digits as the width of the ROM permits.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A phase accumulator continuous phase modulator having a symbol input and a symbol clock input, said phase accumulator continuous phase modulator providing a phase state signal of said symbol input, said phase accumulator continuous phase modulator comprising:
   register means connected to said symbol input and to said symbol clock input, said register means operating to sequentially store a plurality of bits of each symbol;
   clock means connected to said symbol clock input and having a second input equal to the number of samples per symbol, said clock means operating to produce first and second clock signals;
   phase incrementing means connected to said register means and to said clock means, said phase incrementing means being operated in response to said first clock signal to produce a plurality of phase increment signals proportional to said symbols of said symbol input; and
   phase accumulator means connected to said phase incrementing means and to said clock means, said phase accumulator means being operated in response to said second clock signal to sequentially add each of said plurality of phase increment signals to produce said phase state signal.

2. A phase accumulator continuous phase modulator as claimed in claim 1, wherein said phase accumulator means includes two inputs and one output, said output of said phase accumulator means being connected to one of said inputs of said phase accumulator means.

3. A phase accumulator continuous phase modulator as claimed in claim 2, said clock means including first clock means operating to produce said second clock signal.

4. A phase accumulator continuous phase modulator as claimed in claim 3, wherein said clock means further includes counter means connected to said first clock means and to said phase incrementing means, said counter means operating in response to said second clock signal to produce said first clock signal.

5. A phase accumulator continuous phase modulator as claimed in claim 4, wherein there is further included:
   latching means connected to said output of said phase accumulator means and to said first clock means, said latching means being operated in response to said second clock signal to store said phase state signal;
   first conversion means connected to said latching means and being operated in response to said stored phase state signal to produce the sine of said phase state signal; and
   second conversion means connected to said latching means and being operated in response to said stored phase state signal to produce the cosine of said stored phase state signal.

6. A phase accumulator continuous phase modulator as claimed in claim 5, wherein there is further included multiplying means connected between said first clock means and said phase accumulator means, said multiplying means being operated in response to said second clock signal to produce a third clock signal which is said second clock signal multiplied by a predetermined constant L.

7. A phase accumulator continuous phase modulator as claimed in claim 6, said register means including a plurality of register device means serially connected and each register device means having an input and an output, said input of one register device means being connected to said symbol input and said output of said one register device means being connected to said input of a next one of said register device means, each of said register device means being connected to said symbol clock input, the number of register device means of said plurality being proportional to the frequency of said symbols.

8. A phase accumulator continuous phase modulator as claimed in claim 7, said phase incrementing device means including a plurality of phase incrementing means corresponding to said plurality of register device means, each of said phase incrementing device means being connected to said counter means and to a corresponding one of said register device means, each phase incrementing device means being sequentially operated in response to said first clock signal to produce a corresponding phase increment signal.

9. A phase accumulator continuous phase modulator as claimed in claim 8, wherein said phase accumulator means further includes multiplexer means connected between each of said plurality of phase incrementing device means and said phase accumulator means, said multiplexer means being operated to sequentially transmit said plurality of phase incrementing signals to said phase accumulator means.

10. A phase accumulator continuous phase modulator as claimed in claim 9, each of said register device means including D-type flip-flop means.

11. A phase accumulator continuous phase modulator as claimed in claim 10, each of said phase incrementing device means including preprogrammed Read-Only-Memory means.

12. A phase accumulator continuous phase modulator as claimed in claim 11, said first conversion means including preprogrammed Read-Only-Memory means and operating to produce said in-phase signal of said phase state signal.

13. A phase accumulator continuous phase modulator as claimed in claim 12, said second conversion means including preprogrammed Read-Only-Memory means and operating to produce said quadrature signal of said phase state signal.

14. A phase accumulator continuous phase modulator as claimed in claim 13, said plurality of register device means being equal to said predetermined constant L.

15. A phase accumulator continuous phase modulator as claimed in claim 14, said plurality of phase incrementing device means being equal to said predetermined constant L.

16. A phase accumulator continuous phase modulator having a symbol input, samples per symbol input and a symbol clock input, said phase accumulator continuous phase modulator providing a phase state signal of said symbol input, said phase accumulator continuous phase modulator comprising:
   register means connected to said symbol input and to said symbol clock input, said register means operating to sequentially store a plurality of bits of each symbol;

clock means connected to said symbol clock input and having a second input equal to the number of samples per symbol, said clock means operating to produce first, second, third and fourth clock signals;

phase incrementing means connected to said register means and to said clock means, said phase incrementing means being operated in response to said first, third and fourth clock signals to produce a plurality of phase increment signals proportional to said symbols of said symbol input; and phase accumulator means connected to said phase incrementing means and to said clock means, said phase accumulator means being operated in response to said third clock signal to sequentially add each of said plurality of phase increment signals to produce said phase state signal.

17. A phase accumulator continuous phase modulator as claimed in claim 16, wherein said phase accumulator means includes two inputs and one output, said output of said phase accumulator means being connected to one of said inputs of said phase accumulator means.

18. A phase accumulator continuous phase modulator as claimed in claim 17, wherein said clock means further includes:

clock generator means connected to said symbol clock input, to said samples per symbol input, and to said phase incrementing means, said clock generator means operating to produce said first and said third clock signals; and multiplying means connected to said clock generator means, to said phase accumulator means and to said phase incrementing means, said multiplying means being operated in response to said first clock signal to produce said third clock signal for transmission to said phase accumulator means and to produce said fourth clock signal for transmission to said phase incrementing means.

19. A phase accumulator continuous phase modulator as claimed in claim 18, said register means including a plurality of register device means serially connected and each register device means having an input and an output, said input of one register device means being connected to said symbol input and said output of said one register device means being connected to said input of a next one of said register device means, each of said register device means being connected to said symbol clock input, the number of register device means of said plurality being proportional to the frequency of said symbols.

20. A phase accumulator continuous phase modulator as claimed in claim 19, said phase incrementing means including:

multiplexer means connected to each of said plurality of register device means and to said multiplying means, said multiplexer means being operated in response to said fourth clock signal of said multiplying means to sequentially transmit said symbol input; and phase incrementing device means connected to said multiplexer means, to said phase accumulator means, to said multiplier means and to said clock generator means, said phase incrementing device means being operated in response to said second and to said fourth clock signals and to said transmitted symbol input to produce a corresponding phase increment signal.

21. A phase accumulator continuous phase modulator as claimed in claim 20, wherein there is further included:

latching means connected to said output of said phase accumulator means and to said clock generator means, said latching means being operated in response to said first clock signal to store said phase state signal;

first conversion means connected to said latching means and being operated in response to said stored phase state signal to produce the sine of said phase state signal; and second conversion means connected to said latching means and being operated in response to said stored phase state signal to produce the cosine of said stored phase state signal.

22. A phase accumulator continuous phase modulator as claimed in claim 21, each of said register device means including D-type flip-flop means.

23. A phase accumulator continuous phase modulator as claimed in claim 22, said phase incrementing device means including preprogrammed Read-Only-Memory means.

24. A phase accumulator continuous phase modulator as claimed in claim 23, said preprogrammed Read-only-Memory means including partitioned Read-only-Memory device means.

25. A phase accumulator continuous phase modulator as claimed in claim 24, said first conversion means including preprogrammed Read-Only-Memory means and operating to produce said in-phase signal of said phase state signal.

26. A phase accumulator continuous phase modulator as claimed in claim 25, said second conversion means including preprogrammed Read-Only-Memory means and operating to produce said quadrature signal of said phase state signal.

27. A phase accumulator continuous phase modulator as claimed in claim 26, said plurality of phase incrementing means being equal to said predetermined constant L.

* * * * *

UNITED STATES PATENT AND TRADEMARK OFFICE
CERTIFICATE OF CORRECTION

PATENT NO. : 4,873,500

DATED : October 10, 1989

INVENTOR(S) : Thad J. Genrich

It is certified that error appears in the above-identified patent and that said Letters Patent is hereby corrected as shown below:

In column 7, claim 16, line 11, delete "third" and substitute --second--.

Signed and Sealed this

Thirteenth Day of November, 1990

Attest:

HARRY F. MANBECK, JR.

*Attesting Officer*  *Commissioner of Patents and Trademarks*